US010442885B2

(12) United States Patent
Kamm et al.

(10) Patent No.: US 10,442,885 B2
(45) Date of Patent: Oct. 15, 2019

(54) HYDROLYSIS-STABLE POLYURETHANE FOR COATING ELEMENTS IN MARITIME APPLICATIONS

(71) Applicant: BASF SE, Ludwigshafen (DE)

(72) Inventors: Andre Kamm, Bohmte (DE); Julia Liese, Bremen (DE); Karl Gust, Clawson, MI (US)

(73) Assignee: BASF SE, Ludwigshafen (DE)

( * ) Notice: Subject to any disclaimer, the term of this patent is extended or adjusted under 35 U.S.C. 154(b) by 1068 days.

(21) Appl. No.: 14/102,687

(22) Filed: Dec. 11, 2013

(65) Prior Publication Data

US 2014/0170352 A1 Jun. 19, 2014

Related U.S. Application Data

(60) Provisional application No. 61/736,584, filed on Dec. 13, 2012.

(51) Int. Cl.

| | |
|---|---|
| ***C08G 18/48*** | (2006.01) |
| ***C08G 18/66*** | (2006.01) |
| ***C08G 18/72*** | (2006.01) |
| ***C08G 18/76*** | (2006.01) |
| ***C08G 18/79*** | (2006.01) |
| ***C09D 175/08*** | (2006.01) |
| *F16L 59/14* | (2006.01) |

(52) U.S. Cl.

CPC ..... *C08G 18/4837* (2013.01); *C08G 18/4812* (2013.01); *C08G 18/4866* (2013.01); *C08G 18/6674* (2013.01); *C08G 18/724* (2013.01); *C08G 18/7664* (2013.01); *C08G 18/792* (2013.01); *C09D 175/08* (2013.01); *F16L 59/143* (2013.01); *Y10T 29/49826* (2015.01); *Y10T 428/1393* (2015.01)

(58) Field of Classification Search

None

See application file for complete search history.

(56) References Cited

U.S. PATENT DOCUMENTS

| | | | |
|---|---|---|---|
| 5,422,380 A * | 6/1995 | Mendelsohn .......... | C08J 9/0061 521/107 |
| 6,000,438 A | 12/1999 | Ohrn | |
| 6,265,524 B1 | 7/2001 | Takemoto et al. | |
| 2007/0240781 A1* | 10/2007 | Huntemann ....... | C08G 18/6666 138/146 |

FOREIGN PATENT DOCUMENTS

| | | |
|---|---|---|
| CN | 101545565 A | 9/2009 |
| DE | 102 56 550 A1 | 6/2004 |
| JP | 2000-95855 A | 4/2000 |
| WO | WO 99/03922 A1 | 1/1999 |
| WO | WO 02/16733 A1 | 2/2002 |
| WO | WO 2004/003424 A1 | 1/2004 |
| WO | WO 2005/056629 A1 | 6/2005 |
| WO | WO 2007/042411 A1 | 4/2007 |
| WO | WO 2010/003788 A1 | 1/2010 |

* cited by examiner

*Primary Examiner* — Robert S Walters, Jr.

(74) *Attorney, Agent, or Firm* — Oblon, McClelland, Maier & Neustadt, L.L.P.

(57) ABSTRACT

A process for producing a polyurethane-coated conduit element includes mixing a) a mixture of aromatic and aliphatic polyisocyanate with, b) at least one polymeric compound having at least two hydrogen atoms which are reactive toward isocyanate, c) at least one chain extender, d) a catalyst, and e) optionally at least one other auxiliary, additive, or both, to form a reaction mixture; applying the reaction mixture to a conduit element; and allowing the reaction mixture to react to form a polyurethane layer. The polyurethane-coating conduit element is suitable for maritime applications in the oil and gas industry, which polyurethane has improved hydrolysis stability at high temperatures and nevertheless satisfies the high mechanical demands in the oil and gas industry.

14 Claims, No Drawings

HYDROLYSIS-STABLE POLYURETHANE FOR COATING ELEMENTS IN MARITIME APPLICATIONS

The present invention relates to a process for producing polyurethane-coated conduit elements and their use preferably in maritime environments, in which (a) a mixture of aromatic and aliphatic polyisocyanate is mixed with (b) at least one polymeric compound having at least two hydrogen atoms which are reactive toward isocyanate, (c) chain extenders having a functionality of from 2 to 4 and a hydroxyl number of from 500 to 2500 mg KOH/g, (d) catalyst and (e) optionally other auxiliaries and/or additives to form a reaction mixture, the reaction mixture is applied directly or indirectly to a conduit element and allowed to react to form a polyurethane layer, wherein the chain extender index KV of the isocyanates (a) and of all isocyanate-reactive compounds of the components (b) to (e) according to the formula (1)

$$KV = \frac{M(\text{aromat}\cdot\text{isocyanate})\cdot \text{NCO}(\text{aromat}\cdot\text{isocyanate})\cdot 56100}{M(\text{chain extender})\cdot \text{OHN}(\text{chain extender})\cdot 4200}\cdot 100 \quad (1)$$

is from 1 to 100, where M (aromat. isocyanate) is the proportion by weight of the aromatic isocyanate, in % by weight, based on the sum of the total weight of isocyanate used and isocyanate-reactive compounds of the components (b) to (e), NCO (aromat. isocyanate) is the NCO content of the aromatic isocyanate, in % by weight, and M (chain extender) is the total weight of the chain extender, in % by weight, based on the sum of the total weight of isocyanate used and the isocyanate-reactive compounds in the components (b) to (e). The present invention further relates to conduit elements which can be obtained by such a process.

In the recovery of petroleum from the sea, petroleum reserves are increasingly being recovered from great depths. The petroleum from such reservoirs has a temperature of greater than 100° C. (up to 150° C.). This oil is pumped via pipelines from the offshore reservoir to the land. In order to reduce the heat loss from the oil and thereby avoid precipitation of waxes from the oil in the case of a cessation of pumping, the pipeline is provided with a coating composed of, for example, polyurethane.

Thus, WO 2005/056629 describes a process for producing a polyurethane filled with hollow glass spheres in order to reduce the heat loss from an oil pipeline. In WO 2005/056629, aromatic isocyanates are preferably used.

Due to the ever deeper wells and the resulting higher temperature of the oil, the pipeline coatings are subjected to ever higher thermal stress. This thermal stress under water requires improved hydrolysis stability of the coating.

WO 2007/042411, WO 99/03922 and WO 2010/003788 disclose coatings based on polyisocyanurates. These have the advantage of better temperature stability. However, the hydrolysis stability at high temperatures is only improved to a limited extent compared to normal polyurethanes. Furthermore, the systems have the disadvantage of reacting particularly quickly, so that filling of large volumes can be achieved only with difficulty. Likewise, the polyisocyanurates used in the published documents are relatively brittle because of the high crosslinking by the isocyanurate ring.

It is known from P. A. Ykaman, Recent developments in aliphatic thermoplastic PU, Thermoplastische Elastomere III, Rapra Technology Limited, 1991, that polyether polyurethane based on aliphatic isocyanates has improved hydrolysis stability compared to polyurethane based on aromatic isocyanates. However, a disadvantage of the aliphatic isocyanates is their high volatility. Due to the toxicity on inhalation, processing of aliphatic isocyanates requires complicated safety precautions. In addition, aliphatic isocyanates usually react quite sluggishly.

Another possible way of circumventing the problem of toxicity of aliphatic isocyanates such as HDI is the use of modified aliphatic isocyanates (functionality>2), e.g. isocyanurates. Such modified, aliphatic isocyanates having a functionality of greater than 2 are marketed, for example, under the trade name Basonat®. These polyfunctional aliphatic isocyanates display good reactivity due to the high proportion of isocyanate, but the mechanical properties of these polyurethanes are unsatisfactory.

It was an object of the present invention to develop a coating composed of polyurethane for preferably maritime applications in the oil and gas industry, which polyurethane has improved hydrolysis stability at high temperatures and nevertheless satisfies the high mechanical demands in the oil & gas industry.

This object is achieved by a polyurethane-insulated conduit element which can be produced by a process in which (a) a mixture of aromatic and aliphatic polyisocyanate is mixed with (b) at least one polymeric compound having at least two hydrogen atoms which are reactive toward isocyanate, (c) chain extenders having a functionality of from 2 to 4 and a hydroxyl number of from 500 to 2500 mg KOH/g, (d) catalyst and (e) optionally other auxiliaries and/or additives to form a reaction mixture, the reaction mixture is applied to a conduit element and allowed to react to form a polyurethane layer, wherein the chain extender index KV of the isocyanates (a) and of all isocyanate-reactive compounds of the components (b) to (e) according to the formula (1)

$$KV = \frac{M(\text{aromat}\cdot\text{isocyanate})\cdot \text{NCO}(\text{aromat}\cdot\text{isocyanate})\cdot 56100}{M(\text{chain extender})\cdot \text{OHN}(\text{chain extender})\cdot 4200}\cdot 100 \quad (1)$$

is from 1 to 100.

Here, KV is the chain extender index, M (aromat. isocyanate) is the proportion by weight of the aromatic isocyanate, in % by weight, based on the sum of the total weight of isocyanate used and isocyanate-reactive compounds of the components (b) to (e), NCO (aromat. isocyanate) is the NCO content of the aromatic isocyanate, in % by weight, and M (chain extender) is the total weight of the chain extender, in % by weight, based on the sum of the total weight of isocyanate used and the isocyanate-reactive compounds in the components (b) to (e).

Furthermore, this object is achieved by a polyurethane-insulated conduit element which can be produced by a process in which (a) a mixture of aromatic and aliphatic polyisocyanate is mixed with (b) at least one polymeric compound having at least two hydrogen atoms which are reactive toward isocyanate, (c) chain extenders having a functionality of from 2 to 4 and a hydroxyl number of from 500 to 2500 mg KOH/g, (d) catalyst and (e) optionally other auxiliaries and/or additives to form a reaction mixture, the reaction mixture is introduced into a mold and cured to form a molding, the molding is removed from the mold and applied to a conduit element, wherein the chain extender index KV of the components (a) to (c) according to the formula (1) is from 1 to 100.

For the purposes of the present invention, polyurethane-coated conduit elements are not only classical coated pipe coatings but also polyurethane-coated weld regions of pipelines, known as "field joints", and polyurethane-coated objects which are joined to pipelines, e.g. muffs, well connections, eruption crosses, pipe collectors, pumps and buoys. Conduit elements also comprise polyurethane-coated cables, preferably off-shore cables. Furthermore, pipes having sheathing for reinforcement, e.g. bend stiffeners or bend restrictors are also encompassed by the expression polyurethane-coated conduit element, where the bend stiffeners and the bend restrictors correspond to the polyurethane coating. The polyurethane-coated conduit element according to the invention is preferably a conduit element of an off-shore pipeline or an off-shore cable. Here, "off-shore" means that these objects come into contact with sea water during normal use. The polyurethane-coated conduit element according to the invention is particularly preferably a polyurethane-coated pipe of an off-shore pipeline, a field joint of an off-shore pipeline or an eruption cross (also referred to as X-mas tree) of an off-shore pipeline, in particular an off-shore pipeline for conveying crude oil.

Coating of the parts can be carried out directly or indirectly; in the case of indirect coating, the polyurethane is produced separately and then applied by means of, for example, screwing to the element to be coated. Preference is given to polyurethane being poured directly onto the surface of the material to be coated. In general, the surfaces to be coated consist of metals such as steel, iron, copper or aluminum or of plastics such as polypropylene or epoxy resins. To improve adhesion, conventional bonding agents such as internal bonding agents which are added to the polyurethane components, external bonding agents which are applied directly to the surface to be coated and/or physical bonding agents can optionally also be used. The surface to be coated can also be pretreated, for example by application of a flame or plasma treatment.

For the purposes of the present invention, isocyanate-reactive compounds of the components (b) to (e) are all compounds of these components which have hydrogen groups which are reactive toward isocyanate. If, for example, catalysts which have OH groups are used, these have to be taken into account. Likewise, for example, suspension media or solvents which comprise OH groups and are used, for example, as suspension media or solvents for one of the starting materials, e.g. suspensions in castor oil, have to be taken into account.

As isocyanates, use is made of a mixture (a) comprising aliphatic and aromatic isocyanates, each of which can also be modified.

As aliphatic and aromatic isocyanates, preference is given to using the aliphatic or aromatic isocyanates which are customarily used for producing polyurethane. These can be unmodified or modified, with modification being considered to be reaction of these isocyanates to form an isocyanate-terminated polyisocyanate prepolymer and/or conversion into biuret-, allophanate-, uretdione-carbodiimide- or isocyanurate-comprising isocyanates. These isocyanates can be used individually or in mixtures. The aliphatic isocyanate preferably comprises less than 15% by weight, particularly preferably less than 7.5% by weight and in particular less than 1% by weight, based on the total weight of the aliphatic isocyanate, of monomeric aliphatic isocyanate. The remaining amount of aliphatic isocyanate is present as modified aliphatic isocyanate.

Examples of unmodified aromatic isocyanates are diphenylmethane 4,4'-diisocyanate, diphenylmethane 2,4'-diisocyanate, the mixtures of monomeric diphenylmethane diisocyanates with homologs of diphenylmethane diisocyanate having more than two rings (polymeric MDI), tolylene 2,4- or 2,6-diisocyanate (TDI). Examples of unmodified aliphatic isocyanates are tetramethylene diisocyanate, hexamethylene diisocyanate (HDI) isophorone diisocyanate (IPDI) or 4,4'-diisocyanatodicyclohexylmethane (H12MDI).

Polyisocyanate prepolymers can be obtained by reacting an excess of polyisocyanates as described above, for example at temperatures of from 30 to 100° C., preferably at about 80° C., with polyols (a-2), to form the prepolymer. To prepare the prepolymers according to the invention, preference is given to using 4,4'-MDI together with uretonimine-modified MDI and commercial polyols based on polyesters, for example derived from adipic acid, or polyethers, for example derived from ethylene oxide and/or propylene oxide.

Polyols are known to those skilled in the art and are described, for example, in "Kunststoffhandbuch, volume 7, Polyurethane", Carl Hanser Verlag, 3$^{rd}$ edition 1993, chapter 3.1. The polymeric compounds having hydrogen atoms which are reactive toward isocyanates as described under b) are preferably used as polyols. Particular preference is given to using polyetherols as polyols.

Conventional chain extenders or crosslinkers are optionally added to the abovementioned polyols in the preparation of the isocyanate prepolymers. Such substances are described below under c). Particular preference is given to using 1,4-butanediol, dipropylene glycol and/or tripropylene glycol as chain extender. The ratio of organic polyisocyanates to polyols and chain extenders is preferably selected so that the isocyanate prepolymer has an NCO content of from 10 to 28%, particularly preferably from 14 to 24%.

In a preferred embodiment, the aromatic isocyanates are bifunctional. In a further preferred embodiment, the aromatic isocyanate comprises diphenylmethane diisocyanate (MDI) or mixtures of diphenylmethane diisocyanate and polyphenylenepolymethylene polyisocyanates (crude MDI) and optionally prepolymers based on MDI.

The aliphatic isocyanate is preferably an aliphatic isocyanate which has been obtained from hexamethylene diisocyanate, isophorone diisocyanate, H12-diphenylmethane diisocyanate or mixtures thereof by modification. Preference is given to modification to form isocyanurates, allophanates or biurets. Here, the proportion of monomeric aliphatic isocyanate is preferably less than 15% by weight, particularly preferably less than 7.5% by weight and in particular less than 1% by weight, based on the total weight of the aliphatic isocyanate. Here, the weight ratio of aromatic isocyanate to aliphatic isocyanate is preferably from 1:99 to 99:1, preferably from 10:90 to 90:10, particularly preferably from 20:80 to 80:20 and in particular from 70:30 to 30:70. If mixtures of aliphatic isocyanates are used, the isocyanate content of the mixture is used to calculate the chain extender index KV according to formula 1.

Polymeric compounds (b) having at least two hydrogen atoms which are reactive toward isocyanates have a molecular weight of at least 450 g/mol. Here, it is possible to use all compounds which have at least two reactive hydrogen atoms and a molecular weight of at least 450 g/mol and are known for polyurethane production. These have, for example, a functionality of from 2 to 8 and a molecular weight of from 450 to 12 000. Thus, it is possible to use, for example, polyether polyamides and/or polyols selected from the group consisting of polyether polyols, polyester polyols and mixtures thereof.

The polyols which are preferably employed are polyetherols, polycarbonate polyols and/or polyesterols having molecular weights in the range from 450 to 12 000, preferably from 500 to 6000, in particular from 500 to <3000, and preferably an average functionality of from 2 to 6, preferably from 2 to 4. Preference is given to using exclusively polyetherols and polycarbonate polyols as polyols.

The polyetherols which can be used according to the invention are prepared by known processes. For example, they can be prepared by anionic polymerization using alkali metal hydroxides, e.g. sodium or potassium hydroxide, or alkali metal alkoxides, e.g. sodium methoxide, sodium or potassium ethoxide or potassium isopropoxide, as catalysts with addition of at least one starter molecule having from 2 to 8, preferably from 2 to 6, reactive hydrogen atoms, or by cationic polymerization using Lewis acids such as antimony pentachloride, boron fluoride etherate, etc. or bleaching earth as catalyst. Polyether polyols can likewise be prepared by double metal cyanide catalysis from one or more alkylene oxides having from 2 to 4 carbon atoms in the alkylene radicals. Tertiary amines, for example triethylamine, tributylamine, trimethylamine, dimethylethanolamine, imidazole or dimethylcyclohexylamine, can also be used as catalyst. For specific uses, monofunctional starters can also be incorporated into the polyether structure.

Suitable alkylene oxides are, for example, tetrahydrofuran, 1,3-propylene oxide, 1,2- or 2,3-butylene oxide, styrene oxide and preferably ethylene oxide and 1,2-propylene oxide. The alkylene oxides can be used individually, alternately in succession or as mixtures.

Possible starter molecules are, for example: water, aliphatic and aromatic, optionally N-monoalkyl-, N,N- and N,N'-dialkyl-substituted diamines having from 1 to 4 carbon atoms in the alkyl radical, e.g. optionally monoalkyl- and dialkyl-substituted ethylenediamine, diethylentriamine, triethylenetetramine, 1,3-propylenediamine, 1,3- or 1,4-butylenediamine, 1,2-, 1,3-, 1,4-, 1,5- and 1,6-hexamethylenediamine, phenylenediamine, 2,3-, 2,4- and 2,6-tolylenediamine (TDA) and 4,4'-, 2,4'- and 2,2'-diaminodiphenylmethane (MDA) and polymeric MDA. Further possible starter molecules are: alkanolamines, such as ethanolamine, N-methylethanolamine and N-ethylethanolamine, dialkanolamines such as diethanolamine, N-methyldiethanolamine and N-ethyldiethanolamine, trialkanolamines such as triethanolamine, and ammonia. Preference is given to using polyhydric alcohols such as ethanediol, 1,2- and 2,3-propanediol, diethylene glycol, dipropylene glycol, 1,4-butanediol, 1,6-hexanediol, glycerol, trimethylolpropane; pentaerythritol, sorbitol and sucrose, and mixtures thereof. The polyether polyols can be used individually or in the form of mixtures.

The polymeric compounds (b) having at least two hydrogen atoms which are reactive toward isocyanates preferably comprise polyether polyols based on a bifunctional starter molecule (b1) and polyether polyols based on a trifunctional starter molecule (b2).

As bifunctional starter molecules for preparing the constituent (b1), it is possible to use, for example, ethanediol, 1,2- and 1,3-propanediol, diethylene glycol, dipropylene glycol, 1,4-butanediol or 1,6-hexanediol or mixtures thereof. Preference is given to using diethylene glycol or dipropylene glycol.

In general, the alkoxylation to form the constituent (b1) is carried out in such a way that the constituent (b1) has a number average molecular weight of from 500 g/mol to 3500 g/mol, preferably from 600 to 2500 g/mol, particularly preferably from 800 to 1500 g/mol.

As trifunctional starter molecules for preparing the constituent (b2), preference is given to using glycerol, trimethylolpropane or mixtures thereof.

In general, the alkoxylation to form the constituent (b2) is carried out in such a way that the constituent (b2) has a number average molecular weight of from 500 g/mol to 8000 g/mol, preferably from 1000 to 6000 g/mol.

In a preferred embodiment, the polyol constitutent (b2) comprises the constituents (b2-1) and (b2-2), where each of these is a polyether polyol based on a trifunctional starter molecule but having a different molecular weight.

The constituent (b2-1) comprises a polyether polyol which is based on a trifunctional starter molecule and has a number average molecular weight of from 500 g/mol to 3500 g/mol, preferably from 1000 to 3200 g/mol, particularly preferably from 1500 to 3000 g/mol, in particular from 1800 to 2900 g/mol.

The constituent (b2-2) is usually a polyether polyol which is based on a trifunctional starter molecule and has a number average molecular weight of from more than 3500 g/mol to 8000 g/mol, preferably from 3700 to 7000 g/mol, particularly preferably from 4000 g/mol to 6000 g/mol.

In a further embodiment, the polymeric compounds having at least two hydrogen atoms which are reactive toward isocyanate comprise, as additional constituent b3), a polyether polyol based on a tetrafunctional or higher-functional starter molecule. Preference is given to using tetrafunctional to hexafunctional starter molecules. Examples of suitable starter molecules are pentaerythritol, sorbitol and sucrose.

As chain extenders c), it is possible to use substances having a molecular weight of less than 450 g/mol, particularly preferably from 60 to 400 g/mol, and a functionality of preferably from 2 to 4. For the purposes of the present invention, chain extenders preferably have functionalities of from 2 to 4 and OH numbers of from 500 to 2500 mg KOH/g, more preferably from 500 to 2000 mg KOH/g and particularly preferably from 500 to 1850 mg KOH/g. These can be used individually or preferably in the form of mixtures. Preference is given to using diols and/or triols having molecular weights of less than 450, particularly preferably from 60 to 400 and in particular from 60 to 350. Possibilities are, for example, aliphatic, cycloaliphatic and/or araliphatic or aromatic diols having from 2 to 14, preferably from 2 to 10, carbon atoms, e.g. ethylene glycol, 1,3-propanediol, 1,4-butanediol, 1,6-hexanediol, 1,10-decanediol and bis(2-hydroxyethyl)hydroquinone, 1,2-, 1,3-, 1,4-dihydroxycyclohexane, diethylene glycol, dipropylene glycol, tripropylene glycol, triols such as 1,2,4-, 1,3,5-trihydroxycyclohexane, glycerol and trimethylolpropane, and low molecular weight hydroxyl-comprising polyalkylene oxides based on ethylene oxide and/or 1,2-propylene oxide and the abovementioned diols and/or triols as starter molecules. As chain extenders (c), particular preference is given to using low molecular weight hydroxyl-comprising polyalkylene oxides based on ethylene oxide and/or 1,2-propylene oxide, particularly preferably ethylene oxide, and trifunctional starters, in particular glycerol, butanediol and dipropylene glycol. If mixtures of two more chain extenders are used, the OH number of the mixture is used for calculating the chain extender index KV according to formula 1.

The polycarbonate polyols which can be used according to the invention are prepared by known processes, for example as described in JP1998000267980 and US62655524. They are obtained, for example, by an ester exchange reaction with an aliphatic diol and dimethyl carbonate. For the purposes of the invention, polycarbonate polyols preferably have number average molecular weights of from 500 to 2000 g/mol, particularly preferably from 500 to 1000 g/mol, and functionalities of preferably of from 2 to 6 and particularly preferably from 2 to 3. As polycarbonate polyols, it is possible to use, for example, commercially available polycarbonate polyols such as Eternacoll® UH 100, UH 50 or PH 200 from UBE Chemicals.

The components b1), b2) and c) and optionally b3) are preferably used in such an amount that the viscosity of a mixture of these substances at 25° C., measured in accordance with DIN 53019, is less than 1000 mPas, preferably less than 500 mPas at 25° C. and particularly preferably from 200 to 400 mPas.

The mixture of polymeric compounds (b) having at least two hydrogen atoms which are reactive toward isocyanate and chain extenders (c) preferably comprises from 20 to 60% by weight, particularly preferably from 30 to 50% by weight, of the component b1) from 20 to 60% by weight, particularly preferably from 30 to 50% by weight, of the component b2) and from 5 to 25% by weight, more preferably from 7 to 20% by weight and particularly preferably from 9 to 18% by weight, of chain extenders and/or crosslinkers c), in each case based on the total weight of the components b) and c).

If constituent b3) is used, the amount used is generally from 0.1 to 15% by weight, preferably from 1 to 10% by weight, particularly preferably from 2 to 7% by weight, based on the total weight of the components (b) and (c). The component b) preferably comprises no further polymeric compounds having hydrogen atoms which are reactive toward isocyanates apart from the components b1), b2), and b3).

As catalysts (d) for producing the polyurethane moldings, preference is given to using compounds which strongly accelerate the reaction of the hydroxyl-comprising compounds of the component (b) and optionally (c) with the organic, optionally modified polyisocyanates (a). Mention may be made by way of example of amidines such as 2,3-dimethyl-3,4,5,6-tetrahydropyrimidine, tertiary amines such as triethylamine, tributylamine, dimethylbenzylamine, N-methylmorpholine, N-ethylmorpholine, N-cyclohexylmorpholine, N,N,N',N'-tetramethylethylenediamine, N,N,N',N'-tetramethylbutanediamine, N,N,N',N'-tetramethylhexanediamine, pentamethyldiethylenetriamine, bis(dimethylaminoethyl)ether, bis(dimethylaminopropyl)urea, dimethylpiperazine, 1,2-dimethylimidazole, 1-azabicyclo[3.3.0]octane and preferably 1,4-diazabicyclo[2.2.2]octane and alkanolamine compounds such as triethanolamine, triisopropanolamine, N-methyldiethanolamine and N-ethyldiethanolamine and dimethylethanolamine. Further possibilities are organic metal compounds, preferably organic tin compounds such as tin(II) salts of organic carboxylic acids, e.g. tin(II) acetate, tin(II) octoate, tin(II) ethylhexoate and tin(II) laurate, and the dialkyltin(IV) salts of organic carboxylic acids, e.g. dibutyltin diacetate, dibutyltin dilaurate, dibutyltin maleate and dioctyltin diacetate, and also bismuth carboxylates such as bismuth(III) neodecanoate, bismuth 2-ethylhexanoate and bismuth octanoate or mixtures thereof. The organic metal compounds can be used either alone or preferably in combination with strongly basic amines. If the component (b) is an ester, preference is given to using exclusively amine catalysts.

Preference is given to using from 0.001 to 5% by weight, in particular from 0.05 to 2% by weight, of catalyst or catalyst combination, based on the weight of the component (b).

Auxiliaries and additives (e) can optionally be added to the mixture of the components a) to d). Mention may here be made by way of example of surface-active substances, dyes, pigments, hydrolysis inhibitors and oxidants, UV stabilizers, water scavengers such as zeolites, latent heat stores and hollow microspheres.

For the purposes of the present invention, the term hollow microspheres refers to organic and mineral hollow spheres. As organic hollow spheres, it is possible to use, for example, hollow polymer spheres, e.g. composed of polyethylene, polypropylene, polyurethane, polystyrene or a mixture thereof. The mineral hollow spheres can comprise, for example, clay, aluminum silicate, glass or mixtures thereof.

The hollow spheres can have a vacuum or partial vacuum in their interior or the interior can be filled with air, inert gases, for example nitrogen, helium or argon, or reactive gases, for example oxygen.

The organic or mineral hollow spheres usually have a diameter of from 1 to 1000 μm, preferably from 5 to 200 μm. The organic or mineral hollow spheres usually have a bulk density of from 0.1 to 0.4 g/cm$^3$. They generally have a thermal conductivity of from 0.03 to 0.12 W/mK.

Preference is given to using hollow glass microspheres as hollow microspheres. In a particularly preferred embodiment, the hollow glass microspheres have a hydrostatic compressive strength of at least 20 bar. For example, 3M—Scotchlite® Glass Bubbles can be used as hollow glass microspheres. The mixture of the components a) to f) preferably does not contain any hollow glass microspheres.

As latent heat stores, it is possible to use encapsulated and nonencapsulated, lipophilic substances having a solid/liquid transition above 20° C., mostly waxes. These can be encapsulated in a polymer. During ongoing crude oil pumping, the latent heat stores take up heat from the warm crude oil and melt. In the case of a brief production stop, the insulating layer cools slowly from the outside, resulting in the lipophilic filling of the latent heat store also cooling, solidifying and thus releasing the absorbed heat to the crude oil again. Similar solutions are described in DE 10256550, WO 2004003424, U.S. Pat. No. 6,000,438, WO 2002016733 or CN 101545565.

Thixotropes such as Laromin® C 260 (dimethylmethylenebiscyclohexylamine) can be comprised as auxiliaries and additives (e). In general, the amount of these thixotropes is in the range from 0.1 to 3 parts by weight per 100 parts by weight of the component (b).

Furthermore, it is possible to add blowing agents known from the prior art as auxiliaries and additives (e). However, preference is given to not using any blowing agents, in particular not adding any water. Thus, the components a) and b) particularly preferably do not comprise any blowing agent apart from residual water which is comprised in industrially produced polyols.

Furthermore, particular preference is given to the residual water content being reduced by the addition of water scavengers. Suitable water scavengers are, for example, zeolites. The water scavengers are used in an amount of, for example, from 0.1 to 10% by weight, based on the total weight of the polyol component b).

If, as described above, no blowing agents are used, compact polyurethanes rather than polyurethane foams are obtained as product according to the invention.

To produce the polyurethane reaction mixture according to the invention, the organic polyisocyanates a) and the components comprising compounds having isocyanate-reactive hydrogen atoms are reacted in such amounts that the equivalence ratio of NCO groups of the isocyanate groups to the sum of the reactive hydrogen atoms is from 1:0.5 to 1:3.50, preferably from 1:0.85 to 1:1.30 and particularly preferably from 1:0.9 to 1:1.15.

The starting components are usually mixed at a temperature of from 0° C. to 100° C., preferably from 15° C. to 60° C. and reacted. Mixing can be carried out in conventional PUR processing machines. In a preferred embodiment, mixing is carried out by means of low-pressure machines or high-pressure machines. Here, the parts to be coated can either be produced by casting in a mold or spraying or by means of a rotational process. However, preference is given to casting in a mold. Here, the reaction mixture of the components (a), (b), (c), (d), (e) and optionally (f) are poured into a mold which comprises the element to be coated, for example the pipe. After curing of the polyurethane, the mold is removed. The material can be used immediately. In a particular embodiment of the invention, the coated part is subjected to a further heat treatment.

In the rotational casting process, the reaction mixture is applied by pouring onto the rotating element, for example the pipeline pipe. Here, the reaction mixture is obtained by means of conventional mixing devices, e.g. a low-pressure mixing head. In a particular embodiment, discharge is effected via a slit die. The advance of the mixing head or of the pipe is generally set so that the desired thickness of the polyurethane layer is achieved at a constant output. For this purpose, the reaction mixture can preferably comprise thixotropes, which prevents dripping of the reaction mixture from the rotating element.

As an alternative, coating can be carried out indirectly. For this purpose, the reaction mixture of the components (a), (b), (c), (d), (e) and optionally (f) is poured into a mold and subsequently removed from the mold. The molding produced in this way is then applied to the pipe element to be coated, for example by screwing or adhesive bonding.

The thickness of the polyurethane layer is preferably from 5 to 200 mm, particularly preferably from 10 to 150 mm and in particular from 20 to 100 mm. One or more further layers, e.g. an insulating layer and/or a covering layer of a thermoplastic, can optionally be applied to the polyurethane layer. Preference is given to no further layers being applied to the polyurethane layer.

The polyurethane coating according to the invention has excellent mechanical properties such as elongation at break and tensile strength and also excellent hydrolysis stability. Furthermore, aliphatic isocyanate can be replaced, giving an inexpensive product having improved mechanical properties.

The invention is illustrated by the following examples.

Starting Materials

- Polyol 1: polyetherol based on glycerol, propylene oxide and ethylene oxide and prepared by means of KOH catalysis with an ethylene oxide end cap and having an OH number of 28 mg KOH/g and a viscosity of 1100 mPas at 25° C.
- Polyol 2: polyetherol based on propylene glycol and propylene oxide and prepared by means of DMC catalysis and having an OH number of 28 mg KOH/g and a viscosity of 900 mPas at 25° C.
- KV 1: 1,4-butanediol having an OH number of 1245 mg KOH/g
- KV 2: Lupranol® 3902 from BASF Polyurethanes having an OH number of 860 mg KOH/g
- Kat 1: Dabco 25% strength dissolved in 1,4-butanediol
- Kat 2: Fomrez UL 28
- ZM 1: 50% strength zeolite paste in castor oil having an OH number of 80 mg KOH/g
- ZM 2: zeolite powder
- ZM 3: Antifoam
- ISO 1: aliphatic isocyanate Basonat HI 100 from BASF having an NCO content of 22%
- ISO 2: aliphatic isocyanate Basonat HA 200 from BASF having an NCO content of 20%
- ISO 3: aromatic isocyanate Lupranat M 20 S from BASF Polyurethanes GmbH having an NCO content of 31.5%
- ISO 4: aromatic isocyanate Lupranat MP 102 from BASF Polyurethanes GmbH having an NCO content of 22.9%
- ISO 5: aromatic isocyanate mixture based on Lupranat M 20 S and Lupranat MP102 and having an NCO content of 25.5%

In examples C1-C3 and E1-E3, the influence of the chain extender index on the mechanical properties and hydrolysis stability is examined. Here, the composition of the isocyanate mixtures indicated in the examples is reported as a mixture of ISO 1:ISO 5 in various weight ratios. The polyol mixtures and the isocyanate mixtures were produced as per table 1 and degassed by means of reduced pressure. After the materials had been degassed, 100 g of the polyol mixture were mixed with the appropriate mass of isocyanate by means of a Speedmixer™ and test plates having a layer thickness of 2 mm were produced. After curing, the materials were heat treated for another 2 hours at 80° C.

| | C1 | E1 | E2 | E3 | C2 | C3 |
|---|---|---|---|---|---|---|
| Polyol 1 | 85.32 | 85.09 | 84.82 | 85.48 | 85.48 | 85.48 |
| KV 1 | 13.00 | 13.00 | 13.00 | 13.00 | 13.00 | 13.00 |
| ZM 1 | 1.50 | 1.50 | 1.50 | 1.50 | 1.50 | 1.50 |
| Kat 1 | 0.18 | 0.18 | 0.18 | 0.00 | 0.00 | 0.00 |
| Kat 2 | | | | 0.02 | 0.02 | 0.02 |
| ISO | | | | | | |
| ISO 1 | 0.00 | 20.00 | 40.00 | 60.00 | 80.00 | 100.00 |
| ISO 5 | 100.00 | 80.00 | 60.00 | 40.00 | 20.00 | 0.00 |
| NCO content of isocyanate mixture | 25.5 | 24.8 | 24.1 | 23.4 | 22.7 | 22.0 |
| Chain extender index | 117 | 96 | 74 | 51 | 26 | 0 |
| Index | 100 | 100 | 100 | 100 | 100 | 100 |
| Mixing ratio 100: | 56.1 | 57.7 | 59.3 | 60.8 | 62.6 | 64.6 |

The calculation of the chain extender index will be shown here purely by way of example for E3:

$$KV-\text{chain extender index}=\frac{(0.4\cdot 60.8)\cdot 25.5\cdot 56100}{13\cdot 1245\cdot 4200}\cdot 100=51$$

The specimens were subsequently stored at 130° C. in steam for a number of hours. After the appropriate storage, the specimens were dried at 60° C. for 12 hours and subsequently conditioned under standard conditions of temperature and pressure for another 24 hours and the remaining mechanical properties were tested.

| | C1 | E1 | E2 | E3 | C2 | C3 |
|---|---|---|---|---|---|---|
| Original | | | | | | |
| Tensile strength [MPa] | 14.9 | 12 | 8 | 8.1 | 2.6 | 1.4 |
| Elongation at break [%] | 196 | 134 | 92 | 97 | 60 | 59 |
| Hydrolysis for 5 h at 130° C. | | | | | | |
| Tensile strength [MPa] | 16.2 | 14.1 | 7.8 | 8.7 | 2.3 | 1.4 |
| Elongation at break [%] | 256 | 195 | 114 | 101 | 56 | 56 |
| 10 h at 130° C. | | | | | | |

-continued

| | C1 | E1 | E2 | E3 | C2 | C3 |
|---|---|---|---|---|---|---|
| Tensile strength [MPa] | 14.2 | 12.3 | 8.8 | 8.3 | 1.8 | 1 |
| Elongation at break [%] | 261 | 185 | 137 | 105 | 47 | 35 |
| 15 h at 130° C. | | | | | | |
| Tensile strength [MPa] | 11.6 | 8.8 | 7.0 | 7.9 | 3.5 | 0.9 |
| Elongation at break [%] | 241 | 154 | 117 | 105 | 85 | 50 |
| 30 h at 130° C. | | | | | | |
| Tensile strength [MPa] | n.m. | 4.8 | 7.2 | 7.8 | 2.4 | 1.2 |
| Elongation at break [%] | n.m. | 220 | 140 | 110 | 70 | 47 |

n.m.: not measurable; the specimen had been destroyed after storage.

The examples C4, E4 and E5 below were produced in a manner analogous to examples C1-C3 and E1-E3 and subjected to a hydrolysis test at 130° C.

| | C4 | E4 | E5 |
|---|---|---|---|
| Polyol 2 | 45.95 | 46.615 | 46.615 |
| KV 1 | 5.00 | 5.00 | 5.00 |
| KV 2 | 45.95 | 46.615 | 46.615 |
| ZM 1 | 2.50 | | |
| ZM 2 | | 1.50 | 1.50 |
| ZM 3 | 0.50 | 0.50 | 0.50 |
| Kat 2 | 0.10 | 0.02 | 0.02 |
| ISO | | | |
| ISO 2 | 100 | 66.7 | 66.7 |
| ISO 3 | | 33.3 | |
| ISO 4 | | | 33.3 |
| NCO content of isocyanate mixture | 20.0 | 23.8 | 21.0 |
| Chain extender index | 0 | 45 | 37 |
| Index | 100 | 100 | 100 |
| Mixing ratio 100: | 178.4 | 149.7 | 170.1 |
| Original | | | |
| Tensile strength [MPa] | 24.5 | 36.9 | 37.1 |
| Elongation at break [%] | 36 | 30 | 74 |
| Hydrolysis for 5 h at 130° C. | | | |
| Tensile strength [MPa] | 19.6 | 37.3 | 37.9 |
| Elongation at break [%] | 30 | 27 | 90 |
| 10 h at 130° C. | | | |
| Tensile strength [MPa] | 22.6 | 37.6 | 37.9 |
| Elongation at break [%] | 25 | 23 | 92 |
| 15 h at 130° C. | | | |
| Tensile strength [MPa] | 22.7 | 36.8 | 38.0 |
| Elongation at break [%] | 28 | 23 | 91 |

As can be seen from the examples, the use of a chain extender index of less than 100, preferably a chain extender index of from 25 to 95, particularly preferably from 35 to 85, leads to improved hydrolysis stability together with good mechanical properties.

The invention claimed is:

1. A process for producing a polyurethane-coated conduit element, the process comprising:

mixing a) a mixture of aromatic and aliphatic polyisocyanate with, b) at least one polymeric compound having at least two hydrogen atoms which are reactive toward isocyanate, c) one or more chain extenders, d) a catalyst, and e) optionally at least one other auxiliary, additive, or both, to form a reaction mixture;

applying the reaction mixture to a conduit element; and allowing the reaction mixture to react to form a polyurethane layer, wherein:

an equivalence ratio of isocyanate groups to a sum of isocyanate-reactive hydrogen atoms ranges from 1:0.5 to 1:1.30; and a chain extender index KV of the reaction mixture calculated according to formula (1):

$$KV = \frac{M(\text{aromat}\cdot\text{isocyanate})\cdot\text{NCO}(\text{aromat}\cdot\text{isocyanate})\cdot 56100}{M(\text{chain extender})\cdot\text{OHN}(\text{chain extender})\cdot 4200}\cdot 100, \quad (1)$$

is from 1 to 100, where

M (aromat. isocyanate) represents a proportion by weight of aromatic isocyanate, in % by weight, based on a total weight of components a) to e);

NCO (aromat. isocyanate) represents an NCO content of the aromatic isocyanate, in % by weight;

M (chain extender) represents a total weight of the one or more chain extenders, in % by weight, based on the total weight of components a) to e); and OHN (chain extender) represents a hydroxyl number of the one or more chain extenders, in mg KOH/g.

2. The process according to claim 1, wherein the chain extender index KV is from 30 to 95.

3. The process according to claim 1, wherein the one or more chain extenders c) have a functionality of from 2 to 4 and a hydroxyl number of from 500 to 2500 mg KOH/g.

4. The process according to claim 1, wherein the aliphatic polyisocyanate in the polyisocyanate mixture a) comprises an isocyanurate-, allophanate- or biuret-modified aliphatic isocyanate, and a proportion of monomeric aliphatic isocyanates is less than 1% by weight, based on a total weight of the aliphatic polyisocyanate.

5. The process according to claim 4, wherein the isocyanurate-, allophanate-, or biuret-modified aliphatic isocyanate is formed from hexamethylene diisocyanate.

6. The process according to claim 1, wherein the chain extender index KV is from 35 to 85.

7. The process according to claim 1, wherein the at least one polymeric compound b) has a molecular weight of at least 450 g/mol.

8. A process for producing a polyurethane-coated conduit element, the process comprising:

mixing a) a mixture of aromatic and aliphatic polyisocyanate with, b) at least one polymeric compound having at least two hydrogen atoms which are reactive toward isocyanate, c) one or more chain extenders, d) a catalyst, and e) optionally at least one other auxiliary, additive, or both, to form a reaction mixture;

introducing the reaction mixture into a mold;

curing the reaction mixture to form a molding;

removing the molding from the mold; and applying the molding to a conduit element to form a polyurethane-coating conduit element, wherein:

an equivalence ratio of isocyanate groups to a sum of isocyanate-reactive hydrogen atoms ranges from 1:0.5 to 1:1.30; and a chain extender index KV of the reaction mixture calculated according to formula (1):

$$KV = \frac{M(\text{aromat} \cdot \text{isocyanate}) \cdot \text{NCO}(\text{aromat} \cdot \text{isocyanate}) \cdot 56100}{M(\text{chain extender}) \cdot \text{OHN}(\text{chain extender}) \cdot 4200} \cdot 100, \quad (1)$$

is from 1 to 100, where

M (aromat. isocyanate) represents a proportion by weight of aromatic isocyanate, in % by weight, based on a total weight of components a) to e);

NCO (aromat. isocyanate) represents an NCO content of the aromatic isocyanate, in % by weight;

M (chain extender) represents a total weight of the one or more chain extenders, in % by weight, based on the total weight of components a) to e); and OHN (chain extender) represents a hydroxyl number of the one or more chain extenders, in mg KOH/g.

9. The process according to claim 8, wherein the chain extender index KV is from 30 to 95.

10. The process according to claim 8, wherein the one or more chain extenders c) have a functionality of from 2 to 4 and a hydroxyl number of from 500 to 2500 mg KOH/g.

11. The process according to claim 8, wherein the aliphatic polyisocyanate in the polyisocyanate mixture a) comprises an isocyanurate-, allophanate- or biuret-modified aliphatic isocyanate, and a proportion of monomeric aliphatic isocyanates is less than 1% by weight, based on a total weight of the aliphatic polyisocyanate.

12. The process according to claim 11, wherein the isocyanurate-, allophanate-, or biuret-modified aliphatic isocyanate is formed from hexamethylene diisocyanate.

13. The process according to claim 8, wherein the chain extender index KV is from 35 to 85.

14. The process according to claim 8, wherein the at least one polymeric compound b) has a molecular weight of at least 450 g/mol.

* * * * *

UNITED STATES PATENT AND TRADEMARK OFFICE

CERTIFICATE OF CORRECTION

PATENT NO. : 10,442,885 B2
APPLICATION NO. : 14/102687
DATED : October 15, 2019
INVENTOR(S) : Andre Kamm et al.

It is certified that error appears in the above-identified patent and that said Letters Patent is hereby corrected as shown below:

In the Specification

Column 5, Line 32, "diethylentriamine," should read -- diethylenetriamine, --

Column 6, Line 5, "constitutent" should read -- constituent --

Signed and Sealed this
Twenty-fourth Day of March, 2020

Andrei Iancu
*Director of the United States Patent and Trademark Office*